United States Patent
LaVallee et al.

(10) Patent No.: US 11,326,268 B2
(45) Date of Patent: May 10, 2022

(54) FLOATING METALLIZED ELEMENT ASSEMBLY AND METHOD OF MANUFACTURING THEREOF

(71) Applicant: Lacks Enterprises, Inc., Grand Rapids, MI (US)

(72) Inventors: Michael LaVallee, Grand Rapids, MI (US); Lee Chase, Grand Rapids, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 0 days.

(21) Appl. No.: 15/911,694

(22) Filed: Mar. 5, 2018

(65) Prior Publication Data

US 2018/0195194 A1     Jul. 12, 2018

Related U.S. Application Data

(63) Continuation-in-part of application No. 14/712,665, filed on May 14, 2015.
(Continued)

(51) Int. Cl.
    *C25D 5/56*     (2006.01)
    *B29C 45/16*    (2006.01)
    (Continued)

(52) U.S. Cl.
    CPC ............... *C25D 5/56* (2013.01); *B29C 45/16* (2013.01); *C23C 18/1605* (2013.01);
    (Continued)

(58) Field of Classification Search
    CPC ... C25D 5/56; C25D 5/12; C25D 5/02; C25D 5/022; C25D 13/22; C25D 7/00;
    (Continued)

(56) References Cited

U.S. PATENT DOCUMENTS

| | | | | |
|---|---|---|---|---|
| 1,545,196 A | * | 7/1925 | Pierce | C25D 3/04 205/284 |
| 3,470,082 A | * | 9/1969 | Reath | C25D 5/00 204/230.6 |
| 4,142,948 A | * | 3/1979 | Tajima | C25D 3/56 205/243 |
| 4,472,249 A | * | 9/1984 | Chessin | C25D 3/04 205/290 |

(Continued)

FOREIGN PATENT DOCUMENTS

JP         59126790 A   *   7/1984

OTHER PUBLICATIONS

European International Search Report dated Jun. 14, 2019.

*Primary Examiner* — Louis J Rufo
(74) *Attorney, Agent, or Firm* — Dickinson Wright PLLC

(57) ABSTRACT

A floating metallized element assembly and method of manufacturing thereof are disclosed. The floating metallized element assembly includes a work piece of a plateable resin and a non-plateable resin including a front side and a back side. The work piece includes at least one plated decorative region on the plateable resin at the front side. The work piece also includes at least one network of the plateable resin at the back side. The work piece additionally includes a plurality of discrete current paths of the plateable resin extending from the at least one network to the at least one plated decorative region. The work piece also includes at least one non-plated decorative region of the non-plateable resin adjacent the at least one decorative region. Metal surfaces are adhered to and disposed on the at least one plated decorative region.

22 Claims, 13 Drawing Sheets

Related U.S. Application Data

(60) Provisional application No. 62/466,692, filed on Mar. 3, 2017.

(51) Int. Cl.
| | |
|---|---|
| *C25D 5/02* | (2006.01) |
| *C23C 18/16* | (2006.01) |
| *C25D 7/00* | (2006.01) |
| *C23C 18/20* | (2006.01) |
| *C25D 13/22* | (2006.01) |
| *C25D 5/12* | (2006.01) |
| *C25D 5/00* | (2006.01) |

(52) U.S. Cl.
CPC ...... *C23C 18/1608* (2013.01); *C23C 18/1653* (2013.01); *C23C 18/2086* (2013.01); *C25D 5/02* (2013.01); *C25D 5/022* (2013.01); *C25D 5/12* (2013.01); *C25D 5/60* (2020.08); *C25D 5/627* (2020.08); *C25D 7/00* (2013.01); *C25D 13/22* (2013.01); *B29K 2995/0003* (2013.01)

(58) Field of Classification Search
CPC ............ C23C 18/2086; C23C 18/1608; C23C 18/1605; C23C 18/1653; B23C 45/16; B29K 2995/0003
See application file for complete search history.

(56) References Cited

U.S. PATENT DOCUMENTS

| | | |
|---|---|---|
| 5,630,928 A | 5/1997 | Ogisu et al. |
| 2002/0197492 A1* | 12/2002 | Hao .................. C25D 5/022 428/457 |
| 2004/0007471 A1* | 1/2004 | Phu .................... C25D 5/56 205/122 |
| 2004/0227688 A1 | 11/2004 | Aisenbrey |
| 2006/0086620 A1 | 4/2006 | Chase et al. |
| 2006/0222824 A1* | 10/2006 | Yasuhara ............ H01H 13/14 428/195.1 |
| 2007/0246852 A1* | 10/2007 | DeBiasi ........... B29C 44/0469 264/45.1 |
| 2009/0117398 A1 | 5/2009 | Helmstetter et al. |
| 2011/0117380 A1* | 5/2011 | Sugawara ............ C25D 5/625 428/612 |
| 2012/0111731 A1* | 5/2012 | Chapaneri ............. C25D 3/08 205/285 |
| 2012/0156443 A1* | 6/2012 | Reeder .............. C23C 18/1641 428/195.1 |
| 2012/0164350 A1* | 6/2012 | Mayer Pujadas ......... B44F 1/02 427/556 |
| 2012/0225255 A1 | 9/2012 | Reeder |
| 2013/0213813 A1* | 8/2013 | Hingley ................ C25D 21/12 205/81 |
| 2016/0237583 A1 | 8/2016 | Case et al. |
| 2016/0333491 A1 | 11/2016 | Lavallee |
| 2017/0096113 A1* | 4/2017 | Hotta .................... B32B 15/08 |
| 2017/0341609 A1* | 11/2017 | Frayer .................... C25D 3/08 |

* cited by examiner

FLOATING METALLIZED ELEMENT ASSEMBLY AND METHOD OF MANUFACTURING THEREOF

CROSS-REFERENCE TO RELATED APPLICATIONS

This utility application is a continuation-in-part of U.S. Ser. No. 14/712,665, filed May 14, 2015 and this utility application claims the benefit of U.S. Provisional Application No. 62/466,692 filed Mar. 3, 2017. The entire disclosures of the above applications are incorporated herein by reference.

TECHNICAL FIELD

The present disclosure relates generally to a floating metallized element assembly and method of manufacturing same. More specifically, the present disclosure relates to a floating metallized element assembly that has both plateable and non-plateable resins to allow for different decorative treatments to yield unique aesthetics.

BACKGROUND OF THE DISCLOSURE

This section provides background information related to the technology associated with the present disclosure and, as such, is not necessarily prior art.

Plated decorative chrome finishes have long been available for various products in the automotive, appliance, consumer electronics, and household application industries. Variations in the deposition methods, processing conditions, and solution makeup of the various types of metals have subsequently resulted in aesthetic variations in the final product. These variations in processing, chemical, and deposition techniques are able to generate different color metal finishes, lower gloss levels, and less distinction of image (DOI) in the metal finish of work pieces all with an eye to improving aesthetics. Examples of these finishes include but are not limited to Bright Chrome, Black Nickel, Black Chrome, and the like. Another exemplary finish that has been employed is Satin Chrome, which involves varying the reflectivity of the underlying metal layer such as by creating more pits in the substrate surface. Varying the degree of reflectivity allows for many different types of metal finishes. Often, these variations are combined with a bright chromium finish in assemblies to 1) complement each other and 2) bring more aesthetic appeal to the final product.

A known method of finishing work pieces to provide a final product that has multiple distinct surface finishes includes utilizing work piece assemblies that are made up of multiple components, each having a different metal finish and which are assembled to form the final product. This practice, while effective, results in multiple operations and multiple sets of tooling which adds significant cost to the final product.

Another known method of finishing work pieces to provide a final product that has multiple distinct surface finishes includes applying bright and satin-like finishing to the surface of the work piece with masking and pre or post surface treatments using abrasive grains such as iron powder, glass powder, silicon oxide, alumina and the like. Molded in texture or surface effects have also been employed to create variation in the metal finish of the work piece by selectively incorporating the texture or surface finish into a portion of the work piece prior to application of a metal finish. However, when such work pieces, which include one section employing these surface effects and another part without these effects, are both subjected to electroplating, the leveling characteristic of the electroplated layer on these two sections does not create the visual effect of two distinct metal surface finishes as desired. Also, the pre and post surface treatments are costly and require an additional operation.

Vacuum metallization and chemical vapor deposition techniques are able to achieve a final product that has segments with different finishes, but are very costly and limited from a performance standpoint in many environments because of the thin layer of metal that results from these techniques. Additionally, physical vapor deposition coatings must include an organic coating thereover to protect the deposited metal layer. This additional step increases labor costs and creates an "orange peel" look due to the fact that the organic coating is not completely smooth.

Another method of creating two distinct surface effects on a work piece includes masking and painting using tinted basecoats and clear coats. Although this method creates the desired effect, it disadvantageously requires an additional painting operation which adds cost to the final product.

Accordingly, there remains a need for a decorative part having multiple distinct appearances, as well as a method of manufacturing the same, which offers more degrees of flexibility to designers and manufacturers with regards to its aesthetic effects while reducing the overall part and manufacturing costs by eliminating the secondary operations.

SUMMARY OF THE DISCLOSURE

This section provides a general summary of some aspects, features and advantages provided by or associated with the inventive concepts hereinafter disclosed in accordance with the present disclosure and is not intended to be a comprehensive summation and/or limit the interpretation and scope of protection afforded by the claims.

According to an aspect of the disclosure, a part having a metal appearance that is electrically isolated ("floating metallized element assembly") is provided. The floating metallized element assembly can include a work piece having a plateable resin and a non-plateable resin and having a front side and a back side. The work piece may include a plurality of plated decorative regions on the front side on the plateable resin and a plurality of networks formed of the plateable resin on the back side. At least one of the plurality of plated decorative regions can couple to a different one of the plurality of networks than another of the plurality of plated decorative regions. The work piece may also include a plurality of discrete current paths extending between the plurality of networks and the plurality of plated decorative regions. The work piece can include at least one non-plated decorative region of the non-plateable resin adjacent at least one of the plurality of plated decorative regions and a plurality of metal surfaces adhered to the plurality of plated decorative regions.

According to another aspect of the disclosure, a method of manufacturing a floating metallized element assembly is also provided. The method can include the step of initiating a multi-shot injection process to mold a work piece. The method can also include the step of injecting a non-plateable resin into a mold cavity. Next, injecting a plateable resin into the mold cavity. The method can proceed by forming a plurality of plated decorative regions on a front side of the work piece each visibly surrounded by the non-plateable resin. The next step of the method can be forming a plurality of networks of plateable resin on a non-visible back side of the work piece. The method may also include the step of forming a plurality of discrete current paths of the plateable resin extending from the plurality of networks to the plurality of plated decorative regions to form circuits. Then, the method can continue with the step of connecting a positive terminal of each of a plurality of power sources to a plurality of anodes and immersing the plurality of anodes in an aqueous solution. The method may also include connecting a negative terminal of each of the plurality of power source to one of a plurality of points of contact on one of the plurality of networks of the plateable resin of the work piece. The method can additionally include the step of immersing the work piece in the aqueous solution. The method can then include the step of positively charging the plurality of anodes using the positive terminals of the plurality of power sources and negatively charging the plurality of networks and plated decorative region of the plateable resin through the plurality of points of contact using the negative terminals of the plurality of power sources. The method can conclude with the step of creating a plurality of metal surfaces on the plurality of plated decorative regions.

Further areas of applicability will become apparent from the description provided herein. The description and specific examples in this summary are only intended for purposes of illustration and are not intended to limit the scope of the present disclosure.

BRIEF DESCRIPTION OF THE DRAWINGS

The drawings described herein are for illustrative purposes only of selected aspects and not all possible or anticipated implementations thereof, and are not intended to limit the scope of the present disclosure.

DESCRIPTION OF THE PREFERRED EMBODIMENTS

Figure 1:
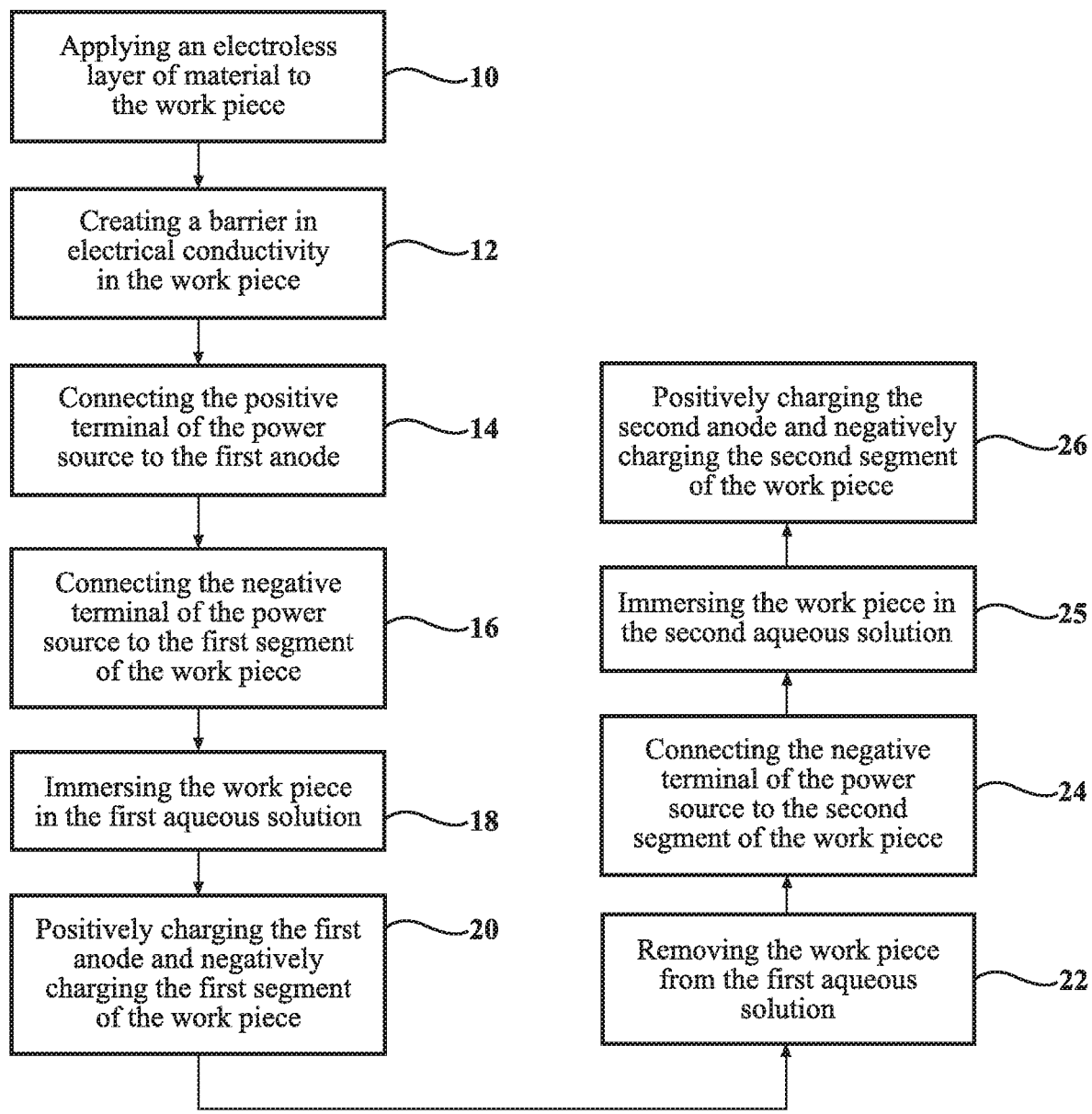
FIG. 1 is flow diagram of a method of plating a work piece in accordance with an aspect of the disclosure.

Referring to the Figures, wherein like numerals indicate corresponding parts throughout the several views, a method is generally shown for plating a work piece 100 using a power source 102 (e.g., a battery) having a positive terminal 104 and a negative terminal 106. It will be appreciated that a variety of suitable power sources may be employed.

According to an aspect, as exemplarily shown in FIGS. 1-4, the method includes creating a barrier 114 to electrical conductivity in a base substrate layer 110 of the work piece 100. Thereafter, an electroless layer of material 108 can be applied to the base substrate layer 110 of the work piece 100 using an electroless plating process, as generally indicated by reference number 10. As known in the art, the electroless plating process generally includes an autocatalytic chemical reaction which causes a metal to be deposited on the base substrate layer 110 of the work piece 100 such that the substrate layer 110 will be conductive. According to an aspect, the electroless layer of material 108 can act as a base layer that has good adherence to both the substrate layer 110 of the work piece 100 as well as to a subsequently plated decorative or electroplated layer 124, 132, as described illustratively below. Therefore, once the electroless layer of material 108 is adhered to the base substrate layer 110 of the work piece 100, the work piece 100 may be well-suited for receiving subsequent electroplated layers thereon. It should be appreciated that suitable metals for plating (both electroless plating and electroplating) according to the subject method may include, but are not limited to, copper, nickel, zinc, palladium, gold, cobalt, chromium (i.e., chrome), and alloys thereof. Furthermore, the material of the substrate layer 110 of the work piece 100 in accordance with an aspect may be plastic, but other suitable materials for both the metal layers and the substrate could be used without departing from the scope of the subject disclosure. According to another aspect, a non-conductive base substrate layer 110, such as a non-conductive plastic, may be rendered conductive in a variety of other suitable ways. For example, the work piece 100 may include or be formed of a conductive plastic. According to a further aspect, a conductive paint may be applied over the base substrate layer 110 such that the part is suitable for receiving subsequent electroplated layers thereon.

According to an aspect, the method can also include creating a barrier 114, 214, 314 in electrical conductivity in the work piece 100 to divide the work piece 100 into a first segment 116 and a second segment 118, with the first and second segments 116, 118 substantially electrically insulated from one another, as generally indicated by reference number 12. As a result, a current may flow through each respective first and second segment 116, 118 without flowing through the other.

Figure 2:
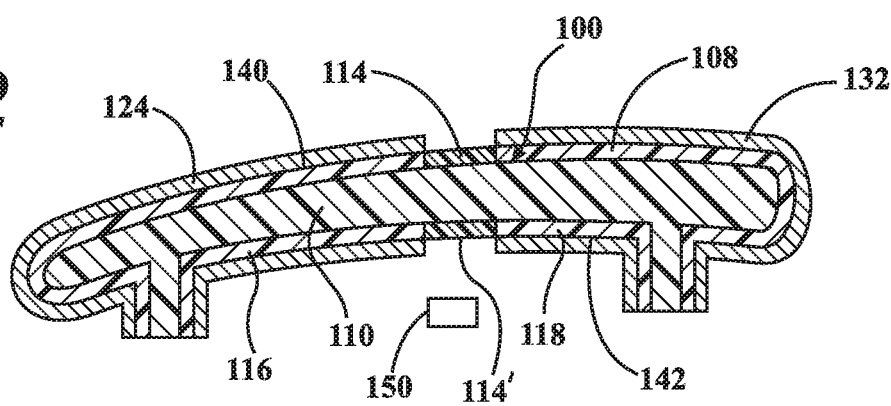
FIG. 2 is a side cross-sectional view of a work piece having a barrier formed thereon in accordance with an aspect of the disclosure.

According to an aspect and as exemplarily shown in FIG. 2, a barrier 114 in electrical conductivity in the work piece 100 may be created, formed or disposed on the base substrate layer 110 prior to application of the electroless layer of material 108 to the work piece 100. According to an aspect, the step of creating a barrier 114 in the work piece 100 may include applying a plating resistant coating on the work piece to define the barrier 114 so as to substantially prevent the subsequent deposition of the electroless layer of material 108 on the barrier 114. The plating resist coating may include a non-plateable plastic resin that may be applied to the surface. The plating resist coating may be a polyvinyl chloride material, a polycarbonate material or the like that is applied to the substrate, such as by painting. It will be appreciated that this material should substantially prevent the electroless layer of material 108 from being formed on areas of the base substrate layer 110 that are insulated from the area to which current is applied. It will also be appreciated that a variety of other suitable materials which resist plating may be employed. Such a material may vary depending on what kind of metal is being applied thereon by way of the electroless plating process. It should be appreciated that since the area of the barrier 114 is unable to receive the electroless layer of material 108, after the electroless layer of material 108 is applied on the remaining portions of the work piece 100, the first and second segments 116, 118 of the work piece 100 may each be configured as respective electrical circuits that are isolated from the other. As shown in FIG. 2, according to an aspect, the barrier 114 may be formed on both a front surface 140 and a back surface 142 of the work piece 100 to ensure that they are electrically isolated from one another so long as current between the sections is isolated. While the barrier 114' is illustrated as disposed opposite the barrier 114, it will be appreciated that they can be offset.

Figure 3:
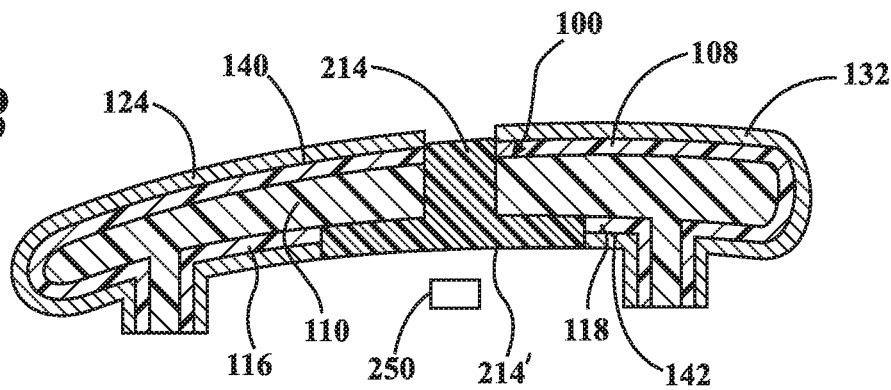
FIG. 3 is a side cross-sectional view of a work piece having a barrier formed thereon in accordance with another aspect of the disclosure.

According to another aspect as exemplarily shown in FIG. 3, a barrier 214 in electrical conductivity in the work piece 100 may be created, formed or disposed on the base substrate layer 110 prior to application of an electroless layer of material 108 to the work piece 100. According to a further aspect, the step of creating a barrier 214 in the work piece 100 may include molding a non-plateable material into or onto the work piece 100 to define the barrier 214 so as to substantially prevent the deposition of the electroless layer of material 108 on the barrier 214. Like the plating resistant coating, the non-plateable material may include a non-plateable plastic resin including, but not limited to, a polyvinyl chloride material, a polycarbonate material or the like. Again, this material should substantially prevent the electroless layer of metal from being formed thereon. According to this aspect, the molding process for creating this layer may include a multi-shot injection molding process, a transfer molding process, an over-molding process or the like. It will be appreciated that a variety of other suitable molding processes may be employed. Again, it should be appreciated that since the area of the barrier 214 is unable to receive the electroless layer of material 108, after the electroless layer of material 108 is applied on the remaining portions of the work piece 100, the first and second segments 116, 118 of the work piece 100 may each function as respective electrical circuits that are isolated from one another. As shown in FIG. 3, according to an aspect, the barrier 214 may be formed on both a front surface 140 and a back surface 142 of the work piece 100 to ensure that they are electrically isolated from one another. While the barrier 214' is illustrated as disposed opposite the barrier 214, it will be appreciated that they can be offset so long as current between the sections is isolated. Additionally, as shown, the barrier 214' may be larger in size and take up more of the back side 142 surface.

Figure 4:
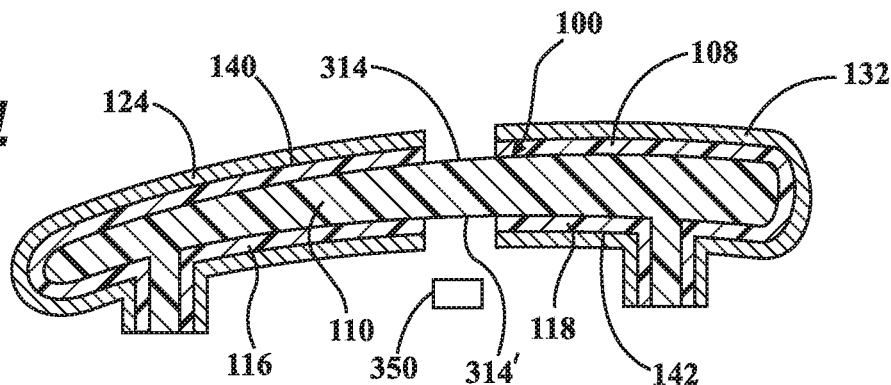
FIG. 4 is a side cross-sectional view of a work piece having a barrier formed thereon in accordance with a further aspect of the disclosure.

According to a further aspect as exemplarily shown in FIG. 4, the step of creating a barrier 314 in electrical conductivity in the work piece 100 can alternately occur after the electroless layer of material 108 has been applied, and may include removing a portion of the electroless layer of material 108 to define the barrier 314 in electrical conductivity. When the electroless layer of material 108 is removed to create the barrier 314 subsequent electroplated layers will not deposit due to the non-conducting surface under the electroless layer, making the first and second segments 114, 116 of the work piece 100 function as respective, isolated, electrical circuits. The barrier segment of the electroless layer of material 108 may be removed by a mechanical mechanism, chemical dissolution or the like. It will be appreciated that a variety of other suitable removing process may be employed. As shown in FIG. 4, according to an aspect, the barrier 314 may be formed on both a front surface 140 and a back surface 142 of the work piece 100 to ensure that they are electrically isolated from one another. While the barrier 314' is illustrated as disposed opposite the barrier 314, it will be appreciated that they can be offset so long as current between the sections isolated.

It should be appreciated that any combination of the aforementioned methods may be used to create the barrier 314 in electrical conductivity. According to an aspect, the barrier 314 on the front surface can be formed utilizing one method and the barrier 314' on the back surface can be formed utilizing another method. For example, the barrier 314 on the front surface can be formed via an injection molding method utilizing a material that is resistant to plating and the barrier 314' on the back surface can be formed utilizing a spray resist coating. It will be appreciated that a variety of other suitable ways may be employed to create barriers to electrical conductivity.

Figure 5:
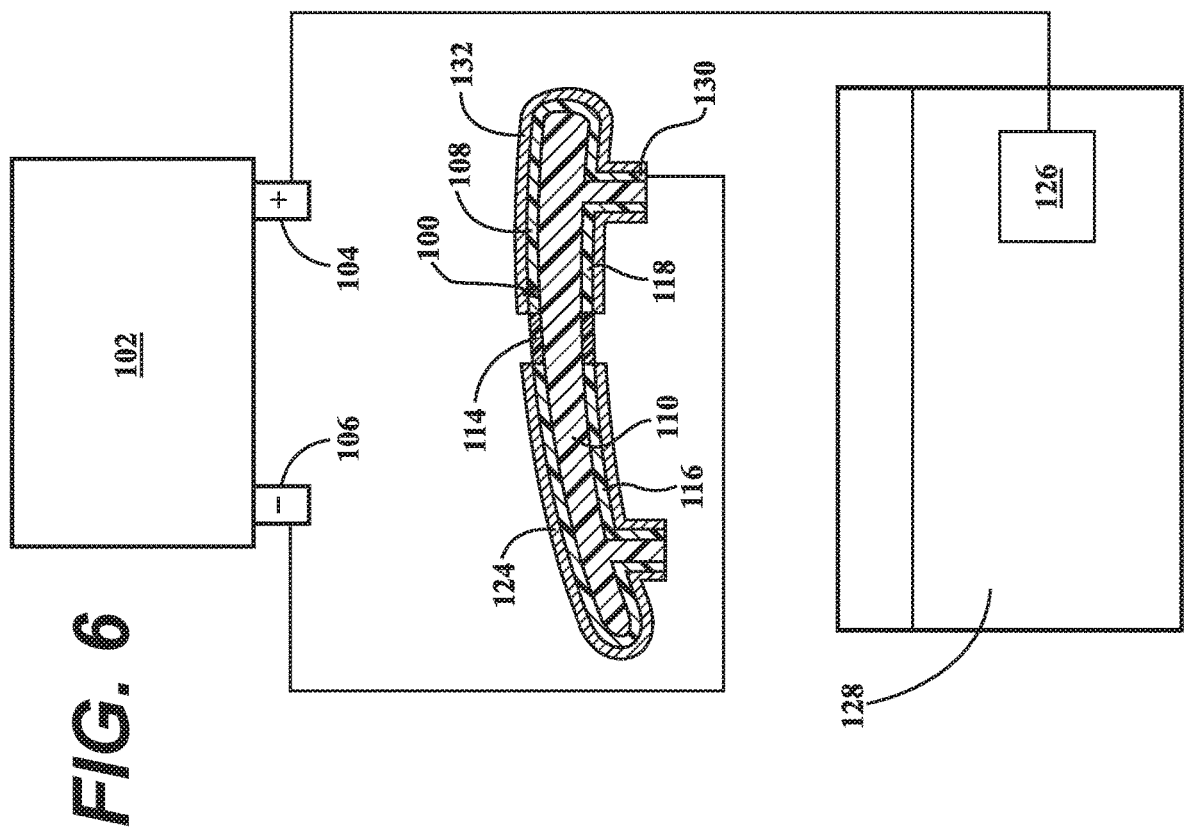
FIG. 5 is a side cross-sectional view of a power source, a first aqueous solution, a first anode and a work piece in accordance with an aspect of the disclosure.

According to an aspect, as shown FIGS. 1 and 5, the method may proceed with the step of connecting the positive terminal 104 of the power source 102 to a first anode 120, as generally indicated by reference number 14. The first anode 120 may be made of a metal material and may be placed in a first aqueous solution 122 with current being applied to the first anode 120. The first anode 120 may be soluble, where the material will dissolve into a first aqueous solution 122 as current is passed through it or insoluble, where the anode material will not dissolve into the solution as current is applied therethrough. It will be appreciated that the first anode 120 could be constructed of a metal material, which may be utilized to form a first decorative surface or layer on the first portion or segment 116 of the work piece 100. The metal material or first decorative surface may include, but is not limited to, copper, nickel, zinc, palladium, gold, cobalt, chromium (i.e., chrome), and alloys thereof. According to an aspect, the metal material from the first anode 120 may be used directly for plating purposes on the work piece 100. Alternatively, the plating to the work piece 100 can occur from the metal ions available in the first aqueous solution 122, as will be understood by one of ordinary skill in the art. The first anode 120 may be in the form of a solid mass of material that is insoluble or soluble, while the plating solution is composed of a plurality of metal salts necessary to achieve the desired plated layer.

According to aspect, the method proceeds with connecting the negative terminal 106 of the power source 102 to a first point of contact 123 on the first segment 116 of the work piece 100, as generally indicated by reference number 16. The work piece 100 may then be immersed in the first aqueous plating solution 122 which may contain metal salts and the first anode 120, as generally indicated by reference number 18. After the work piece 100 has been immersed in the first aqueous solution 122, the method can proceed with 20 positively charging the first anode 120 and negatively charging the first segment 116 of the work piece 100 to cause the metal ions in the first aqueous solution 122, to be reduced to their metallic state at the solution interface of the first segment 116. A layer of metal may then form on the first segment 116 because it is the only location on the work piece 100 that has a supply of electrons to reduce the metal salts to their respective metal state (i.e., $Cu^{2+}+2e \rightarrow Cu^0$). Because there is no supply of electrons on the second segment 118 (since it is electrically isolated), metal ions in the first aqueous solution 122 cannot be reduced to their metallic state.

Figure 6:
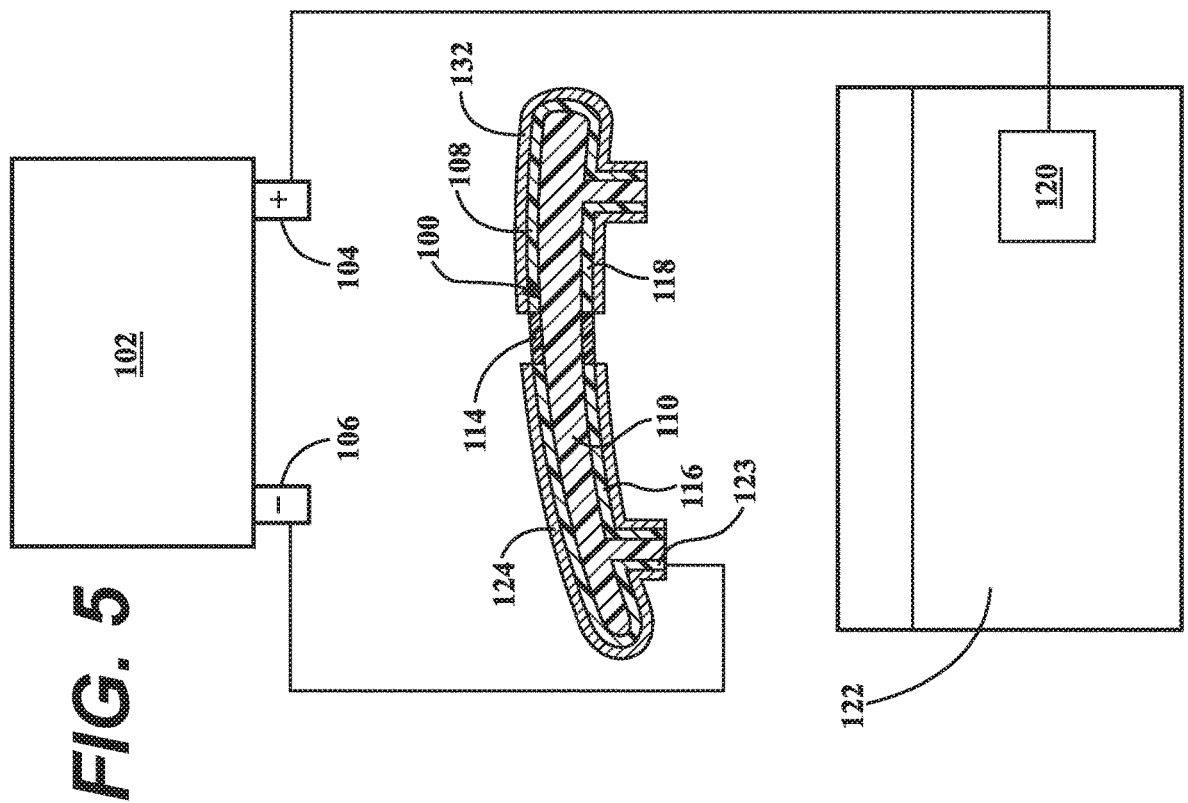
FIG. 6 is a side cross-sectional view of a power source, a second aqueous solution, a second anode and a work piece in accordance with an aspect of the disclosure.

According to another aspect, as shown in FIGS. 1 and 6, the method can then continue with the step of removing the work piece 100 from the first aqueous solution 122 and connecting the positive terminal 104 of the power source 102 to a second anode 126, as generally indicated by reference number 22. Similar to the first anode 120, the second anode 126 may be made of a metal material, which may be utilized to form a second decorative surface or layer on the second portion or segment 118 of the work piece 100. The first decorative surface and the second decorative surface may be different from one another. Also, like the first anode 120, the metal material or second decorative surface from which the second anode 126 can be comprised may include, but is not limited to, nickel, zinc, palladium, gold, cobalt, chromium (i.e., chrome), and alloys thereof. It will be appreciated that a variety of other suitable materials may also be employed. According to an aspect, the second anode 126 may be of a different metal than the metal of the first anode 120. Also like the first anode 120, the second anode 126 may be in the form of a solid mass of material that is insoluble or soluble, while the plating solution is composed of a plurality of metal salts necessary to achieve the desired plated layer. It will be appreciated that different metal finishes can also be achieved utilizing the same anodes such as for example with a Bright Chrome part and a Satin Chrome part. Additionally, other contrasting metal finishes may be employed such as dark and bright trivalent and dark and bright hexavalent. For example, with respect to an automotive grill the outer perimeter of the grill may have a dark finish while the body of the grill may have a bright finish.

According to a further aspect, the method can then proceed with connecting the negative terminal 106 of the power source 102 to a second point of contact 130 on the second segment 118 of the work piece 100, as generally indicated by reference number 24. The work piece 100 may then be immersed in the second aqueous solution 128 which contains the second anode 126, as generally indicated by reference number 25. After the work piece 100 has been immersed in the second aqueous solution 128, the method can continue with positively charging the second anode 126 and negatively charging the second segment 118 of the work piece 100 to cause metal ions from the second plating solution 126 to be passed onto the electroless layer 108 on the second segment 118 of the work piece 100 to form a second electroplated layer 132 on the second segment 118, as generally indicated by reference number 26. It should be appreciated that a metal layer only forms on the second segment 118 of the work piece 100 because the first and second segments 116, 118 are electrically insulated from one another by the barrier 114, 214, 314.

As a result of the aforementioned steps, after the second electroplated layer 132 of metal has been formed on the second segment 118 of the work piece 100, the first and second segments 116, 118 have different metallic finishes. It should further be appreciated that additional barriers 114, 214, 314 in conductivity could be made on the work piece 100 to provide additional segments that are electrically insulated from one another. Such additional segments could be electroplated in accordance with the aforementioned steps to provide for more than two segments of the work piece 100 that have different metallic finishes.

According to a still further aspect, to improve adherence of the first and second decorative or electroplated layers 124, 132 to the work piece 100 and to improve the structural properties of the work piece 100, an intermediate electrolytic layer of copper from an acid copper plating solution may be applied to both the first and second segments 116, 118 after the electroless layer of material 108 is applied to the work piece 100, and prior to electroplating the first and second electroplated layers 124, 132 as described above. Applying this intermediate layer can build the metal thickness to a level that is sufficient to carry the current for electroplating of subsequent metal layers. After the intermediate copper layer has been electrodeposited to a sufficient thickness, an intermediate layer of sulfur-free nickel may be electroplated onto the copper surface to protect the copper from corrosion on all electrical pathways on the part. After the deposition of the intermediate layer of sulfur-free nickel is electroplated on the work piece, there can be a significant amount of metal to carry current, and the copper layer is protected. Therefore, the work piece 100 can be immersed in any suitable plating solution and electroplated as described above to provide the first and second electroplated layers 124, 132 to achieve the desired finishing effect. It should be appreciated that the method could alternatively proceed without these steps and other materials could be used in these steps in place of those described. It will additionally be appreciated that intermediate layers consisting of different materials could be applied to the first and second segments 116, 118 to provide different appearances for the work piece 100.

According to a further aspect of the present disclosure, after a barrier 114, 214, 314 is created as described above to electrically isolate multiple sections of a work piece 100, an electrophoretic coating may be selectively deposited on at least one of the sections of the work piece 100 in order to create different aesthetic affects. It will be appreciated that the deposition of the electrophoretic coating may occur in connection with the deposition of one or more different metal layers as discussed above. It will be appreciated that different electrophoretic coatings may be selectively deposited in the same fashion discussed above such that one electrophoretic coating may be applied to one section of a part without it being applied to another section of the part.

According to a still further aspect of the present disclosure, as the barriers can be formed on both the front side 140 and the back side 142 of the work piece 100, metal layers are not deposited thereon, as discussed above. As shown in the Figures, a light source 150, 250, 350 may be disposed behind the work piece 100 and positioned to emit light into the barriers to provide a backlighting effect, as shown, to enhance aesthetics. It will be appreciated that the use of a transparent or translucent material at the barrier can assist with this effect, although non-translucent or non-transparent materials may also be employed. Alternatively, the work piece 100 may be formed of resins of different colors to provide additional aesthetic affects.

Figure 7:
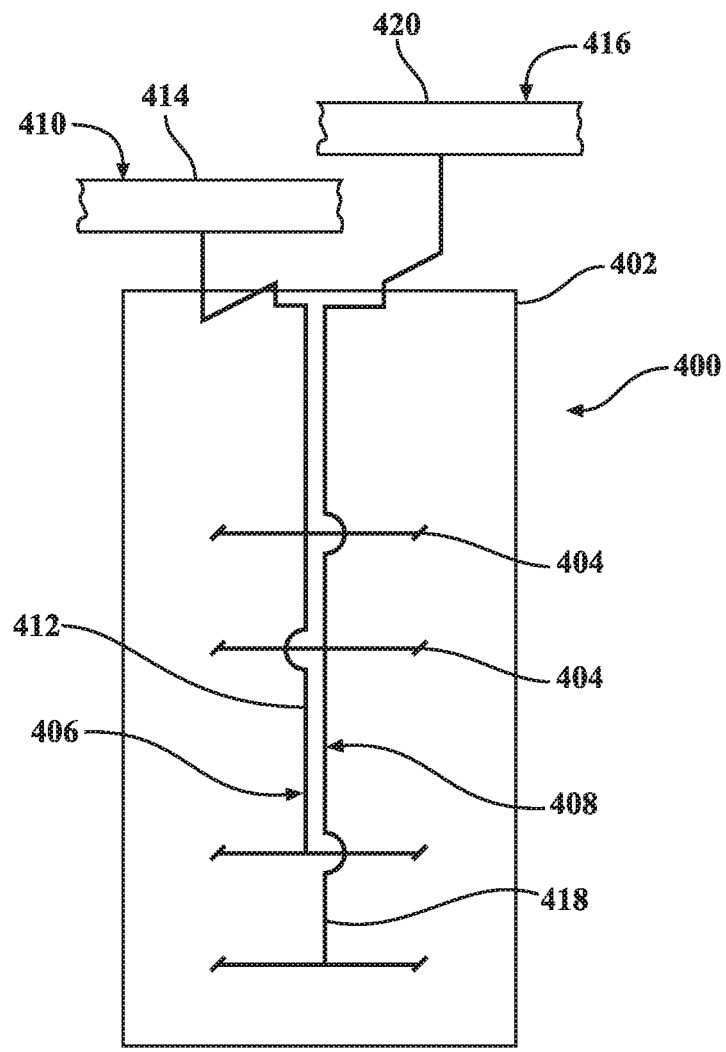
FIG. 7 is a schematic illustration of a plating tool for use in plating a work piece in accordance with an aspect of the disclosure.

FIG. 7 illustrates a plating tool 400 in accordance with an aspect of the disclosure. As shown, the tool 400 can include a plating rack 402 with a plurality of rack tabs 404, which are configured to hold individual work pieces that are to be subjected to a plating process. According to an aspect, the plating tool 400 can include multiple current pathways, which may be referred to as a first circuit 406 and a second circuit 408. Each of the first circuit 406 and the second circuit 408 can be selectively actuated such that each of the circuits can be active at separate times as desired. According to another aspect, the first circuit 406 can be configured such that it is in communication with a first segment 116 of the work pieces 100 located on the rack tabs 404 of the plating rack 402 such that current is applied thereto to effectuate plating a metal layer onto the first segment 116. This allows for first segments of multiple work pieces to be subjected to a plating process simultaneously. According to a further aspect, the second circuit 408 can be configured such that it is in communication with a second segment 118 of the work pieces 100 located on the rack tabs 404 of the plating rack 402 such that current is applied thereto to effectuate plating of a separate metal layer onto the second segment 118. This allows for second segments of multiple work pieces to be subjected to a plating process simultaneously. It will be appreciated to more than two circuits can be integrated into the plating rack 402 to accommodate plating multiple different metal layers onto a surface of the work piece 100.

According to an aspect, the first circuit 406 can include a first power source 410, a first cathode 412 and a first connector bushing 414. The first power source 410 can provide power to the first cathode 412 to charge at least a portion of one or more work pieces. The first power source 410 may be in communication with the first cathode 412 via the first connector bushing 414. According to a further aspect, the first cathode 412 may be integrated into the plating rack 402. According to a still further aspect, the second circuit 408 can include a second power source 416, a second cathode 418, and a second connector bushing 420. The second power source 416 can provide power to the second cathode 418 to charge at least a portion of one or more work pieces. The second power source 416 may be in communication with the second cathode 418 via the second connector bushing 420. The second cathode 418 may also be integrated into the plating rack 402.

According to an aspect, each of the circuits 406, 408 may be electrically insulated from each other. Additionally, each of the circuits 406, 408 can connect to separate power sources such that each of the circuits can be activated individually or simultaneously as desired. The use of separate circuits allows for the plating of different metals on a single work piece. According to a further aspect, the plating rack 402 may be coated with a plate resistant coating to prevent rack plate-up as well as rack damage. The plate resistant coating may be Platisol, however, a variety of other suitable coatings may be employed.

It will also be appreciated that an auxiliary anode may also be incorporated into the tooling to assist in the deposition of metal in areas where the electrical current density is limited, such as recessed areas.

As discussed above, to further improve the aesthetics of decorative parts, parts with multiple distinct surface finishes have been developed. One such multiple finish decorative part, employs a floating metal look where the part includes a metal plated surface finish that appears to be surrounded by non-plated material. These assemblies that are known to be made up of multiple components generally include a metallic finish surrounding a non-metallic finish. This practice while effective, results in multiple operations and multiple sets of tooling which adds significant cost to the final product thus making it impractical for commercial production.

In mold decoration (IMD) and hot stamped foil processes can also be employed to achieve the desired floating metal look, but can be inferior from a performance standpoint and are geometrically limited. Specifically, processing constraints prohibit the foil from being recessed or flush with any plastic not coated with the foil. In other words, the foil must be the proudest surface on the part in order to effectively process the parts. Secondary trimming operations are also generally necessary with this process and add cost to the final part.

Figure 8:
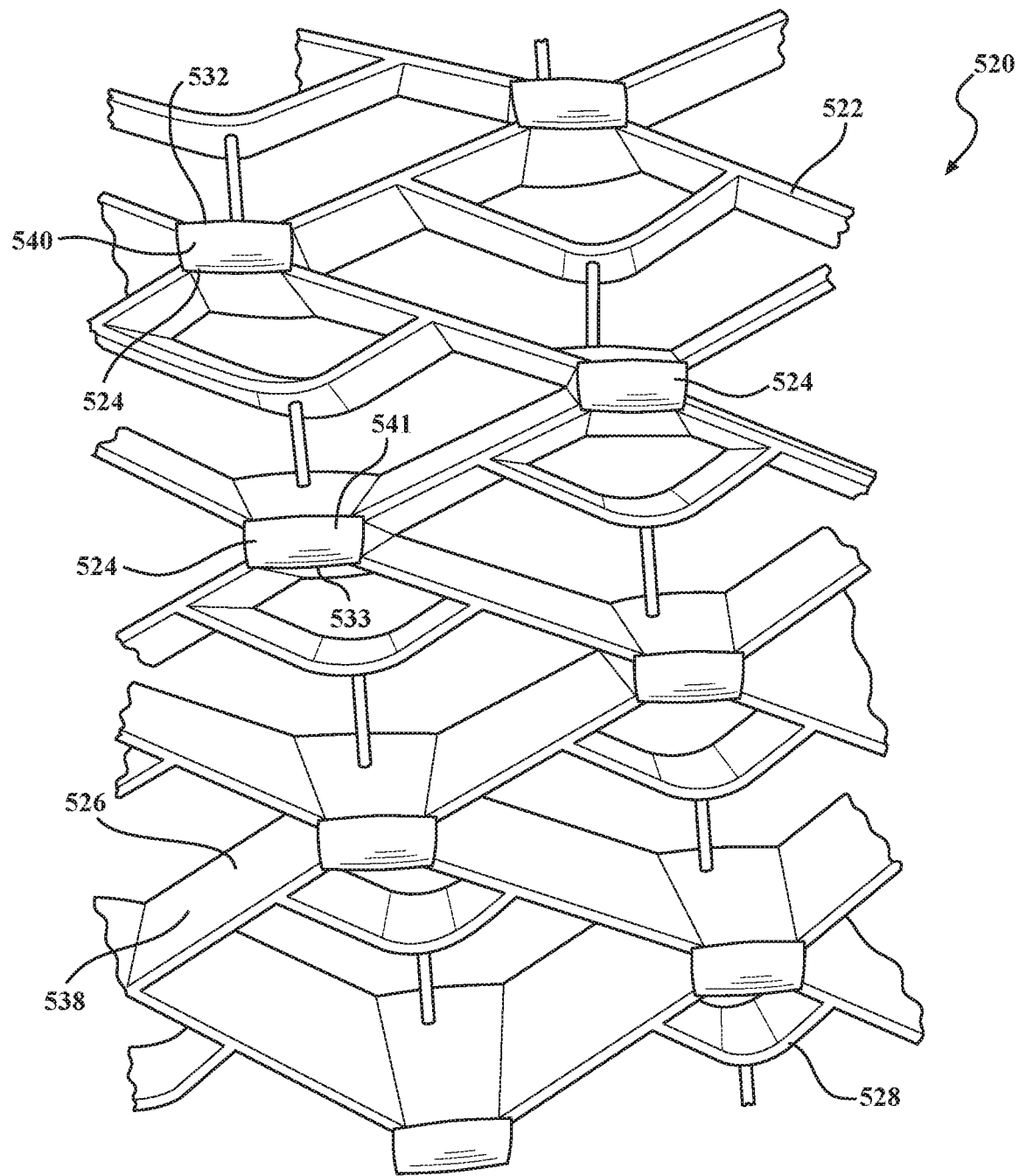
FIG. 8 is a front side view of a floating metallized element assembly according to an aspect of the disclosure.
Figure 11:
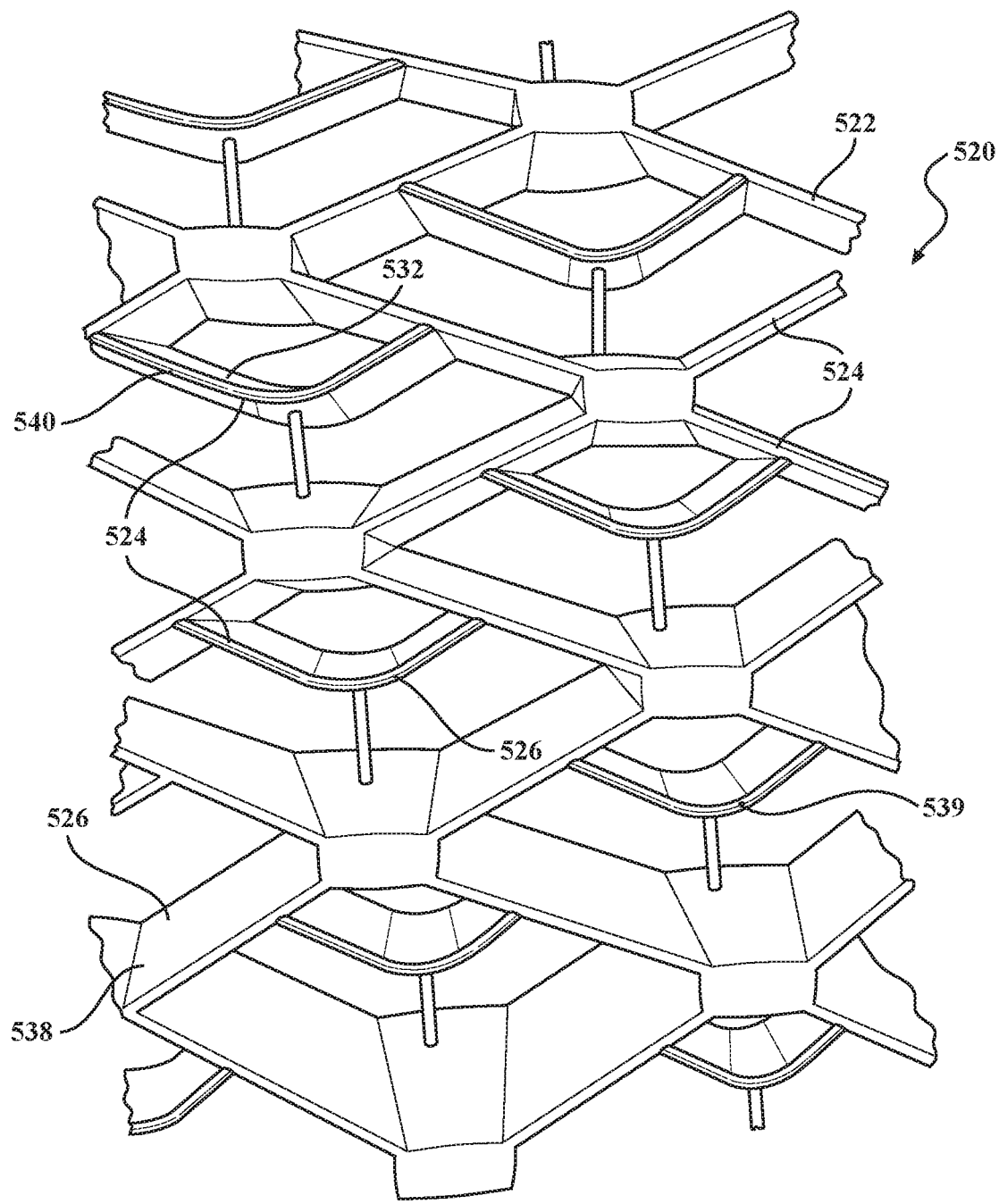
FIG. 11 is a front side view of a floating metallized element assembly according to another aspect of the disclosure.
Figure 13:
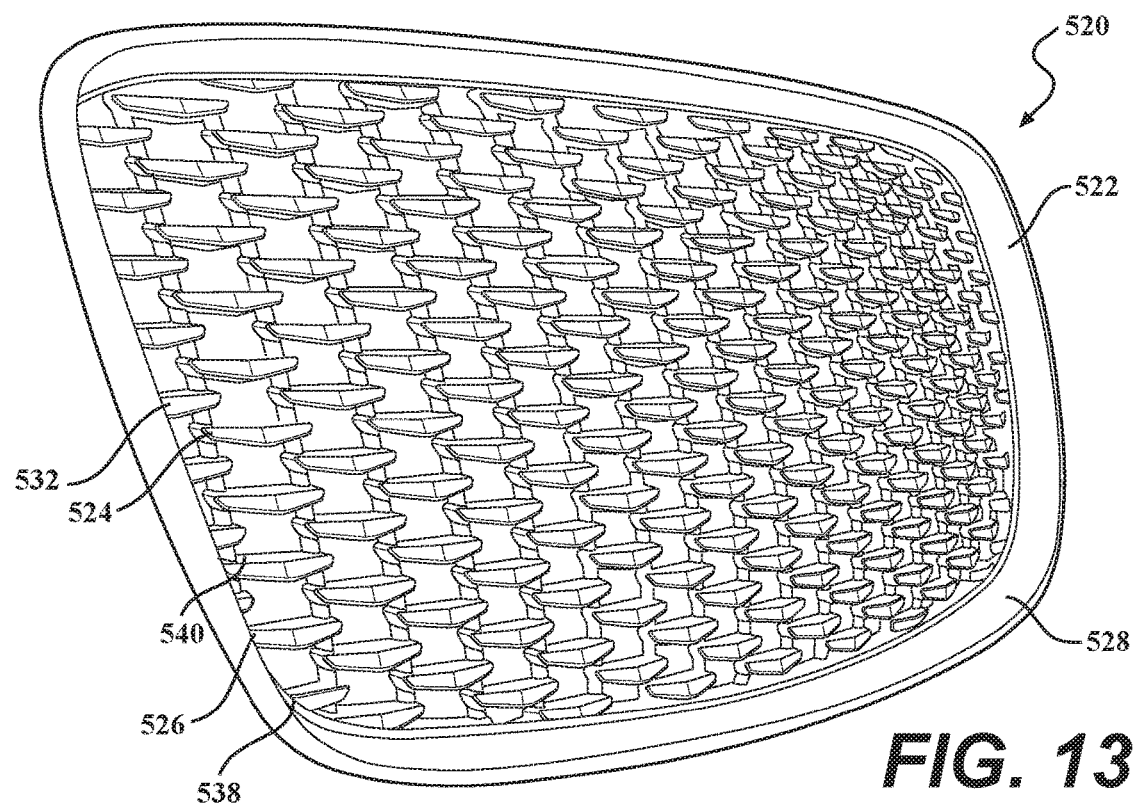
FIG. 13 is a perspective view of a floating metallized element assembly according to yet another aspect of the disclosure.
Figure 14:
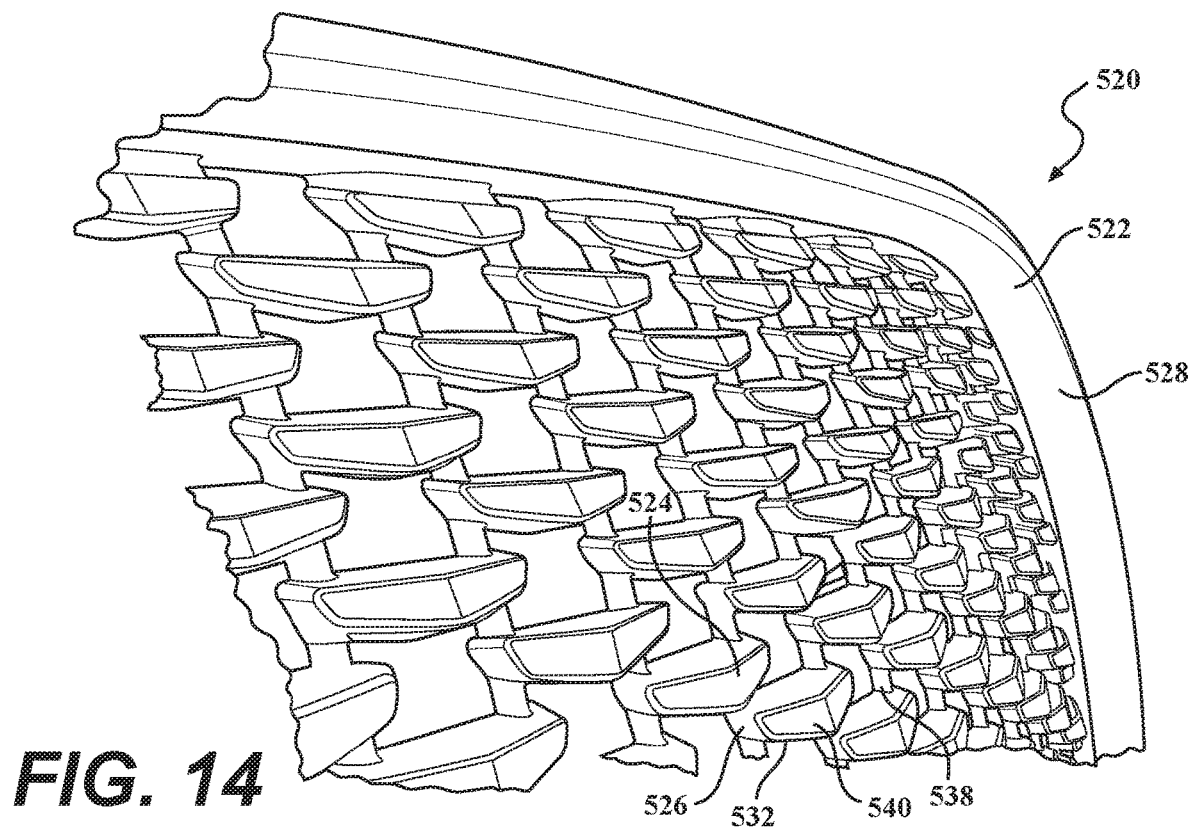
FIG. 14 is an enlarged partial view of the floating metallized element assembly of FIG. 13.

Thus, according to yet another aspect, a floating metallized element assembly 520 and method of manufacturing of the floating metallized element assembly 520 are also provided. As best shown in FIGS. 8, 11, and 13, the floating metallized element assembly 520 can include a work piece 522 of a plateable resin 524 (i.e., can be rendered electrically conductive) and a non-plateable resin 526 (i.e., cannot be rendered electrically conductive by plating processes) and has a front side 528 and a back side 530. More specifically, the plateable and non-plateable resins 524, 526 of the floating metallized element assembly 520 can be co-molded via a multi-shot or insert injection molding process, discussed in more detail below. It will be appreciated that a variety of other suitable forming processes may be employed. It will also be appreciated that a variety of suitable plateable and non-plateable resins may be employed. As shown, the assembly 520 can be configured as an automotive grill, however, it can take the form of a variety of suitable structures for different applications.

Figure 10:
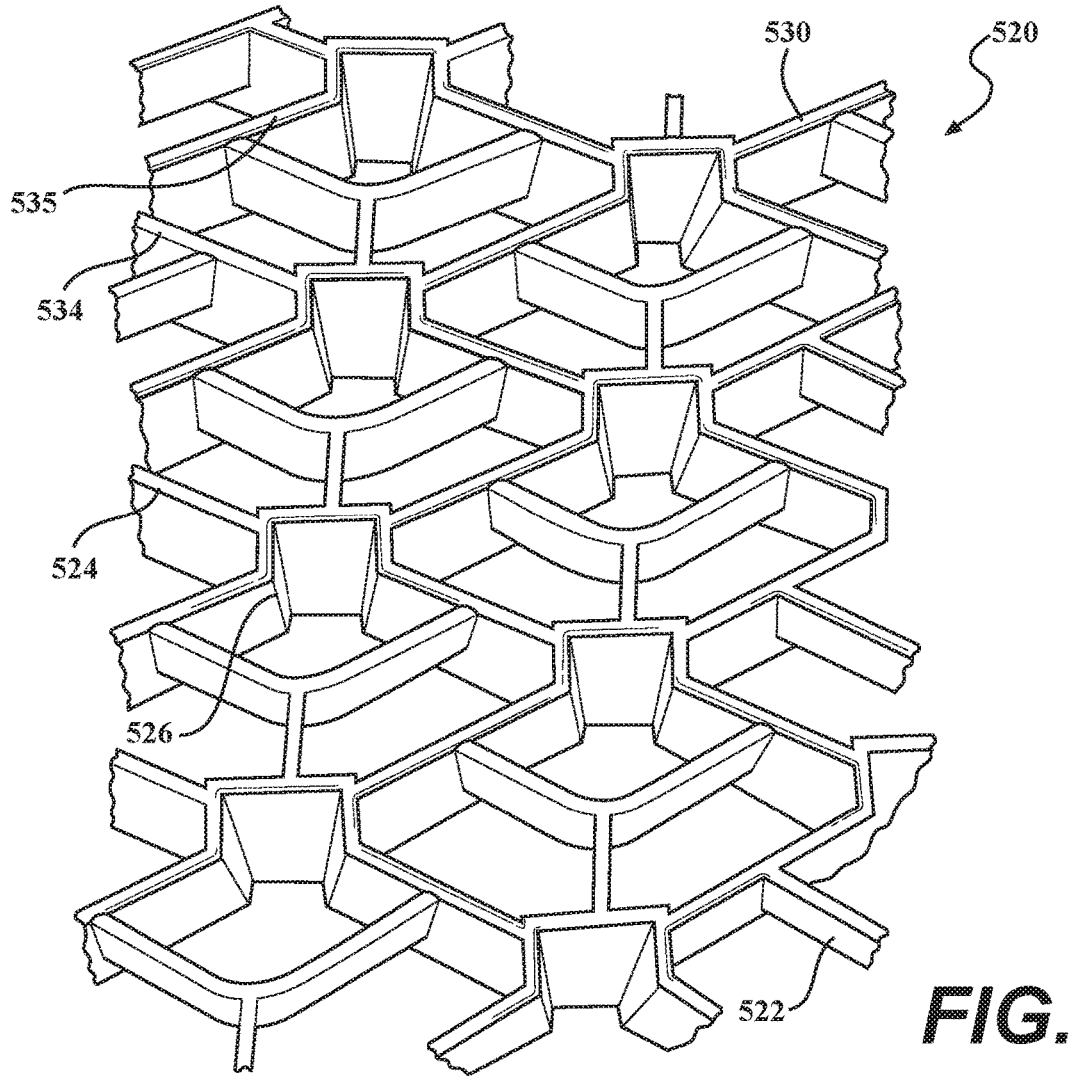
FIG. 10 is a back side view of floating metallized element assembly of FIG. 8 illustrating a plurality of networks of plateable material not seen from the front side.
Figure 12:
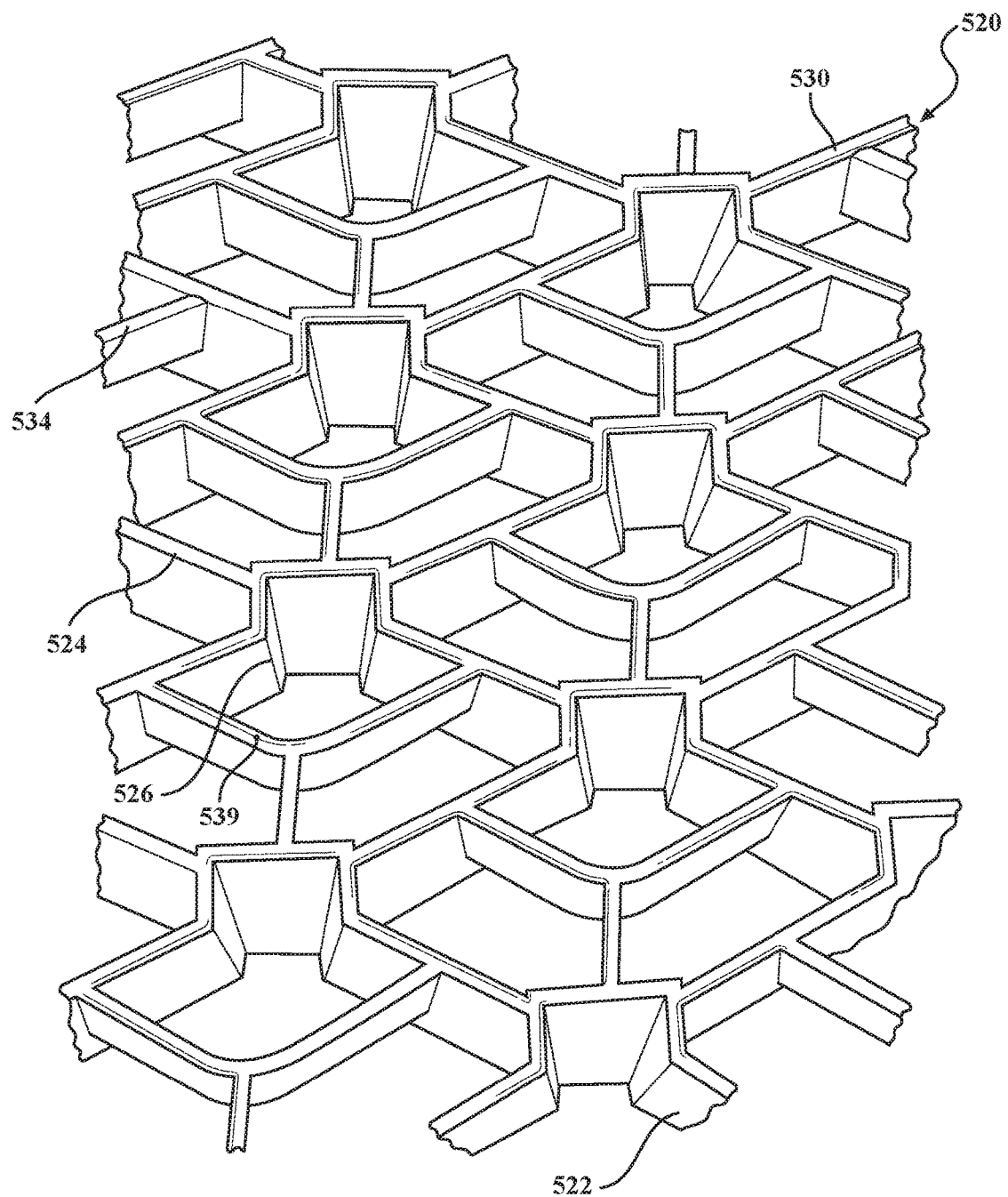
FIG. 12 is the back side of the floating metallized element assembly of FIG. 11 illustrating a network of plateable material not visible from a front view.

The work piece 522 may include at least one plated decorative region 532, 533 of the plateable resin 524 at the front side 528. The work piece 522 can also include at least one network 534, 535 of the plateable resin 524 at the back side 530 (FIGS. 10 and 12). It should be appreciated that the at least one network 534, 535 of the plateable resin 524 could include a plurality of networks 534, 535 or circuits on the back side 530 of the floating metallized element assembly 520 that are separate and not connected (FIG. 10). Multiple networks 534, 535 can allow multiple metallized finishes on the same part (e.g., different from one another), such as a bright chrome finish and a satin chrome finish on different plated resin regions 532, 533.

Figure 9:
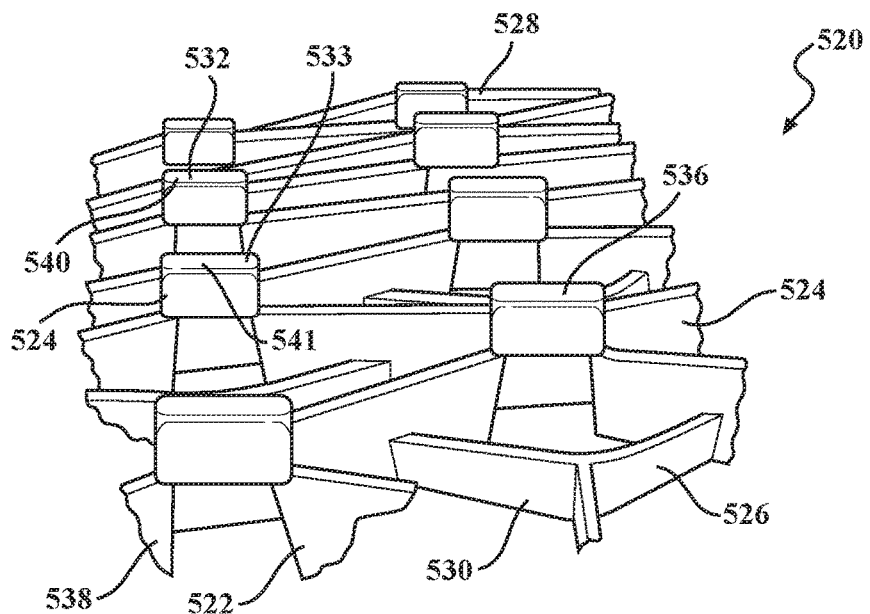
FIG. 9 is a partial perspective view of the floating metallized element assembly of FIG. 8 illustrating a discrete current path that is not visible when the floating metallized element assembly is in a position attached to a vehicle.

The work piece 522 may additionally include a plurality of discrete current paths 536 of the plateable resin 524 extending from the at least one network 534, 535 to the at least one plated decorative region 532, 533. According to an aspect, these discrete current paths 536 can extend to the front side 528 of the work piece 522 such that they are not directly visible by viewers (i.e., from the front) when the floating metallized element assembly 520 in its appropriate position (e.g., installed on a vehicle). The work piece 522 can include at least one non-plated decorative region 538 of the non-plateable resin 526 adjacent to the at least one plated decorative region 532, 533. The discrete current paths 536 can extend along an underside of the floating metallized element assembly 520 (FIG. 9) or may be completely encased or surrounded by the non-plateable resin 526 in the non-plated decorative region 538 (FIGS. 13-16). Thus, the visible front side 528 of the part or floating metallized element assembly 520 will have what appears to be one or more floating metallized elements while the non-visible backside of the part can have a non-visible network 534, 535 of plateable material that connects each floating element so that current can flow from the connection point (i.e., rack tab). As mentioned above, there can be a plurality of networks 534, 535, and the at least one plated decorative region 532, 533 can therefore include a plurality of plated decorative regions 532, 533 (e.g., a first plated decorative region 532 and a second plated decorative region 533) and each of the plurality of plated decorative regions 532, 533 couples to a different one of the plurality of networks 534, 535.

While the discrete current paths 536 can be formed from plateable resin 524 as described above, such discrete current paths 536 could be combined with or otherwise formed using a through-hole or slot 539 that extends from the front side 528 to the back side 530 of the floating metallized element assembly 520. Specifically, plating could occur on the front side 528 through the very small, but discrete through-hole or slot 539 that provides the current path 536 from the back side 530 of the part to the front side 528. Such a through-hole or slot 539 can allow current to pass and thus electroplate to deposit on the front side 528 of the part via the through hole 539 from the back side 530.

Figure 15:
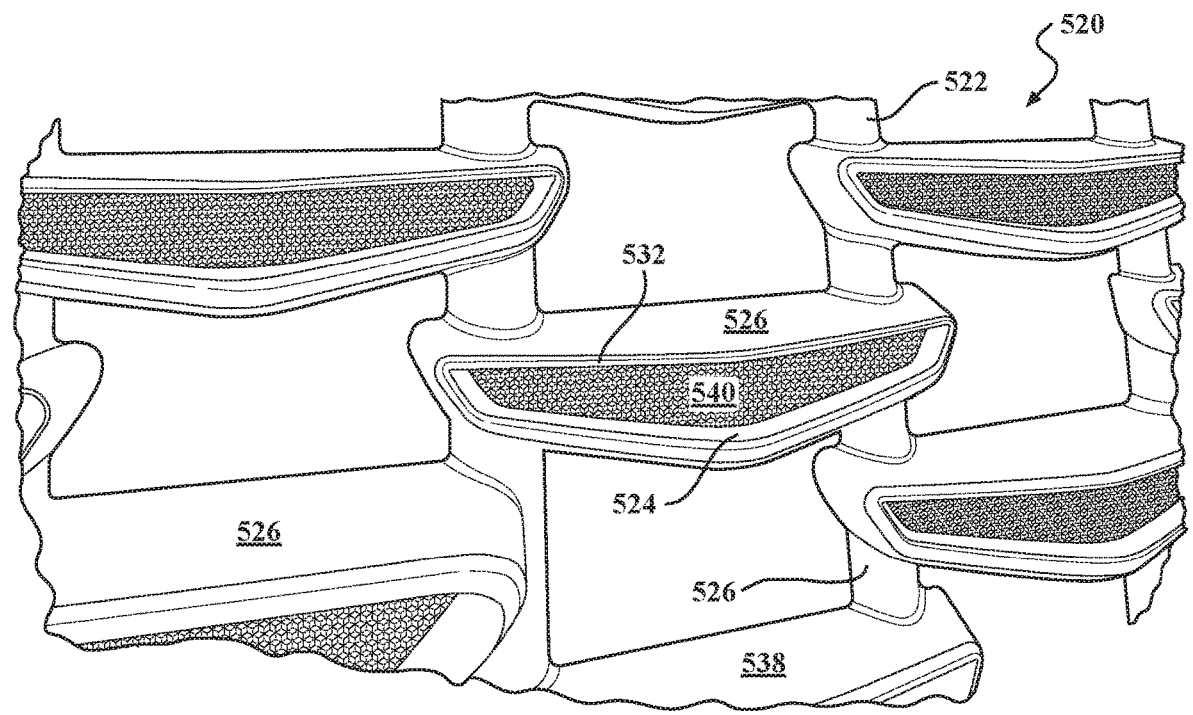
FIG. 15 is a partial view of a floating metallized element assembly according to a further aspect of the disclosure.
Figure 16:
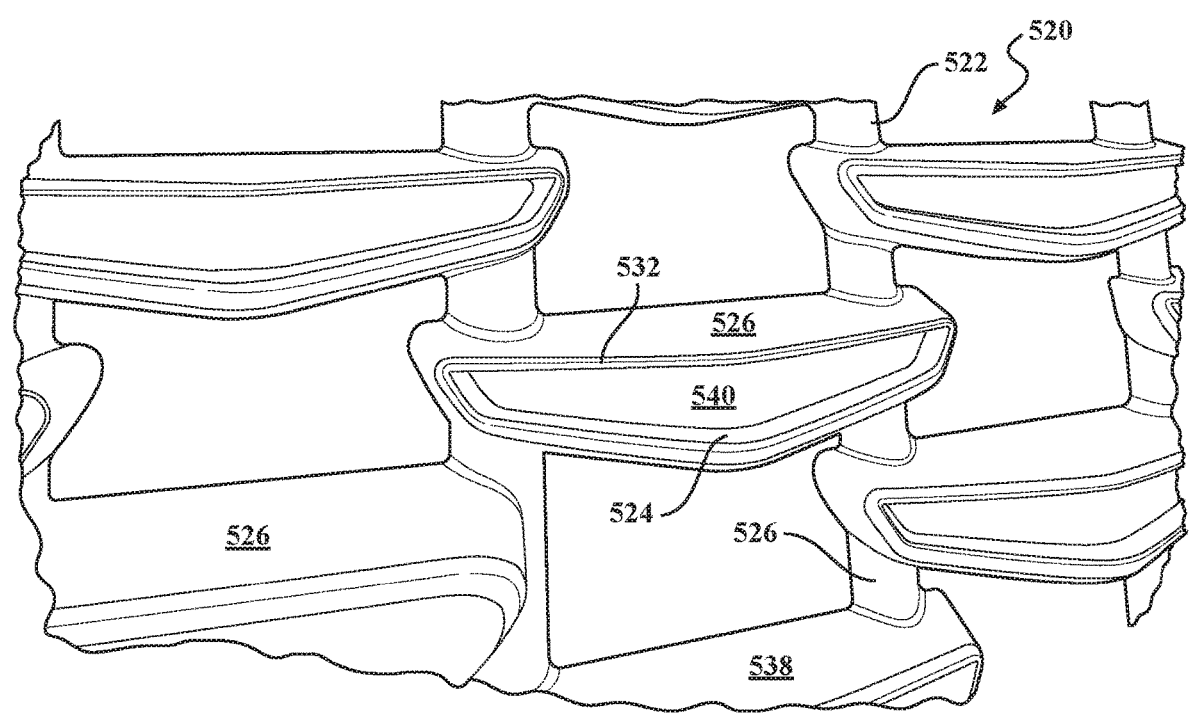
FIG. 16 is a partial view of a floating metallized element assembly according to still another aspect of the disclosure.

At least one metal surface 540, 541 can be adhered to and disposed on the at least one plated decorative region 532, 533. It should be appreciated that while the at least one metal surface 540, 541 of the floating metallized element assembly 520 may be chromium (i.e., chrome), suitable metals for plating according to the disclosure may include other metals such as copper, nickel, zinc, palladium, gold, cobalt, and alloys thereof. In addition, the at least one metal surface 540, 541, can be a plurality of metal surfaces 540, 541, each with a different finish (e.g., satin chrome and bright chrome) and/or metal. The at least one metal surface 540, 541 may be disposed on the plated decorative region 532, 533 in a variety of suitable ways, such as by conventional metal plating processes. As best shown in FIGS. 15 and 16, the at least one metal surface 540, 541 can also include various textures to provide further aesthetic characteristics. Additionally, according to another aspect, the one or both of the at least one plated decorative region 532, 533 and/or the non-plated decorative region 538 may include separate textures to yield up to four additional surface finishes. According to yet another aspect, the non-plateable resin 526 may be a colored resin to yield enhanced aesthetics. In accordance with still a further aspect, the workpiece 522 can include a third material to provide another surface finish such as a translucent non-plateable resin for that may be used for lighting purposes in the non-plateable areas. In addition, for example, the plurality of networks 534, 535 can not only allow multiple metallized finishes on the same part, they may also provide better coverage of plurality of metal surfaces 540, 541 over the plateable resin 524, for instance to the periphery or far away from the plurality of networks 534, 535 (the plating thickness and/or density of the metallized finish may diminish further from a point of contact in which an electrical power source is connected to the work piece 522 at the plurality of networks 534, 535 and further from the plurality of networks 534, 535 themselves). So, the plurality of metal surfaces 540, 541 may not include different finishes and instead may provide for better coverage of the same finish, according to an aspect.

Figure 17A:
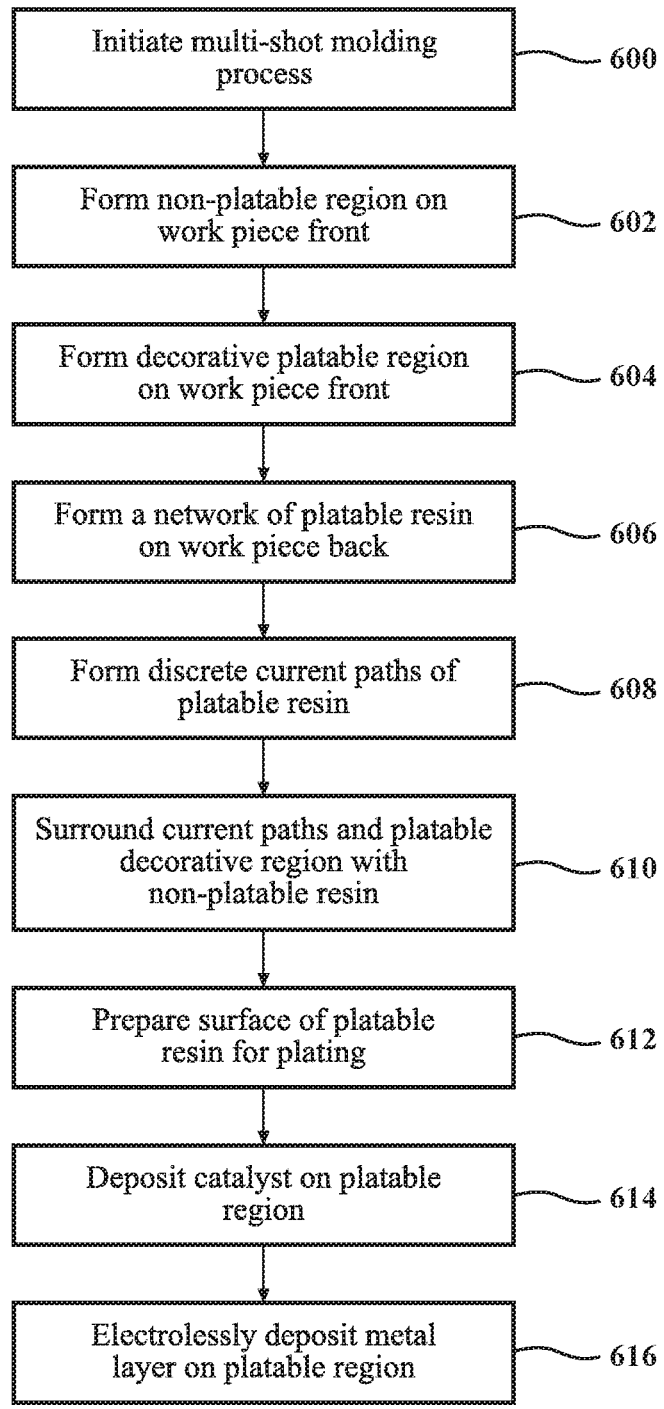
FIGS. 17A-17B are a flow chart illustrating a method of manufacturing a floating metallized element assembly according to aspects of the disclosure.
Figure 17B:
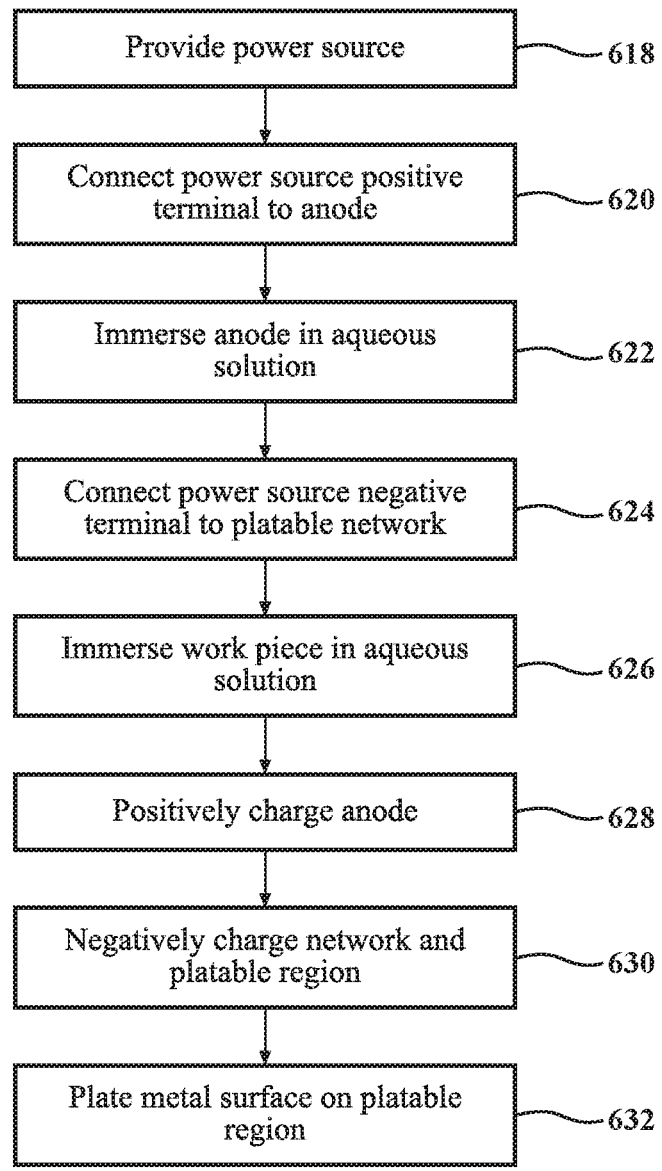

As mentioned above, the present disclosure also relates to a method of manufacturing a floating metallized element assembly 520, illustrated in FIGS. 17A-17B. The method can include the step of 600 initiating a multi-shot injection process to mold a work piece 522. The method can continue by 602 forming at least one non-plated region 538 on a visible front side 528 of the work piece 522 from a non-plateable resin 526. The non-plated region 538 may be decorative (i.e., includes additional surface treatments, such as a texture or color) or non-decorative. According to an aspect, the at least one plated decorative region 532, 533 may be formed on a visible front side 528 of the work piece 522 from a plateable resin 524 (e.g., plateable ABS or PC/ABS resin), as generally indicated by reference number 604.

According to another aspect, the method can include the step 606 of forming at least one network 534, 535 (e.g., a plurality of networks 534, 535) from the plateable resin 524 on a non-visible back side 530 of the work piece 522. The method may then proceed by 608 forming a plurality of discrete current paths 36 from the plateable resin 524 extending from the at least one network 534, 535 to the at least one decorative plated region 532, 533. At the same time, at least one non-plated decorative region 538 may be formed from the non-plateable resin 526 surrounding the plurality of discrete current paths 536 and the at least one plated decorative region 532, 533, as generally indicated by reference number 610. So, the non-plateable resin 526 is preferably molded first and the plateable resin 524 is added in the second shot of the molding process (e.g., overmolded). It will be appreciated that the sequencing can obviously vary.

The method can continue at step 612 by preparing the surface of the plateable resin, including the at least one plated decorative region 532, 533 and the discrete current paths 536 for plating, such as by etching these areas. It will be appreciated that these surfaces can be etched in a variety of suitable ways, including in an acid etch. Next, at step 614 a catalyst may be deposited on the at least one plateable region 532, 533. According to an aspect, at step 616, a metal plated layer may be deposited on the plateable surface in an electroless process, as is known in the art.

To accomplish the plating step, a power source may be provided, as generally indicated by step 618. Next, at step 620 a positive terminal of the power source may be connected to an anode. The electrical power source could, for example, be a battery, however, it will be appreciated that a variety of other suitable power sources may be employed. The method can proceed by 622 immersing the anode in an aqueous solution. Next, at step 624 a negative terminal of the power source can be connected to a point of contact on the at least one network 534, 535 of plateable resin 524 of the work piece 522. Thereafter, according to an aspect, the work piece 522 may be immersed in the aqueous solution, as generally indicated by reference number 626. The anode may be positively charged using the positive terminal of the power source, as generally indicated by reference number 628. Thereafter, the plurality of networks 534, 535 and plurality of plated decorative regions 532, 533 of the plateable resin may be negatively charged (separately for different plating and/or finishes) through the point of contact using the negative terminal of the power source, as generally indicated by reference number 630. At least one metal surface 540, 541 is then plated on the at least one decorative plateable region, as generally indicated by reference number 632. It will be appreciated that other materials to provide further surface finishes may be employed.

In more detail, positively charging the anode and negatively charging the at least one network 534, 535 and the at least one plated decorative region 532, 533 of the plateable resin 524 can cause the metal ions in the aqueous solution to be reduced to their metallic state at the solution interface of the plated decorative region 532. At least one layer of metal (i.e., the at least one metal surface 540, 541) may then form on the at least one plated decorative region 532, 533 because it is the only location on the work piece 522 that has a supply of electrons to reduce the metal salts to their respective metal state (i.e., $Cu^{2+}+2e\rightarrow Cu^0$). Because there is no supply of electrons on the non-plated decorative region 538 (since the non-plateable resin 526 is not rendered conductive, the non-plated decorative region 538 is electrically isolated), metal ions in the aqueous solution cannot be reduced to their metallic state.

In the event that multiple networks 534, 535 are utilized to provide multiple and/or different chrome plate finishes on the same part (e.g., bright chrome finish and a satin chrome finish on the same part), separate power sources can be utilized to provide an increased or decreased electrical current through the terminals of the power source and/or additional anodes or aqueous solutions may be utilized to provide for the varied finishes. The multiple networks 534, 535 thus can be utilized (i.e., connected to and powered by a power source) simultaneously or in a successive fashion.

The method therefore can produce a floating metallized element assembly 520 or plated decorative component having at least one chrome or metalized element adjacent to or surrounded by areas that are not metalized. Advantageously, the metalized elements or areas are located on the front side 528 of the floating metallized element assembly 520 and the discrete current paths 536 connected to the at least one network 534, 535 on the back side 530 are not directly visible by a viewer when the component is in its appropriate position (e.g., installed on the vehicle).

According to still another aspect of the disclosure, the floating metallized element assembly and method of manufacturing thereof disclosed herein advantageously utilizes less metal than other techniques, such as mask and paint techniques. The floating metallized element assembly is capable of meeting performance specifications required of decorative exterior parts of vehicles, for example. Additionally, the floating metallized element assembly disclosed herein gives the appearance of floating chrome elements when assembled in car position, without requiring secondary operations after plating (i.e., paint).

Figure 18:
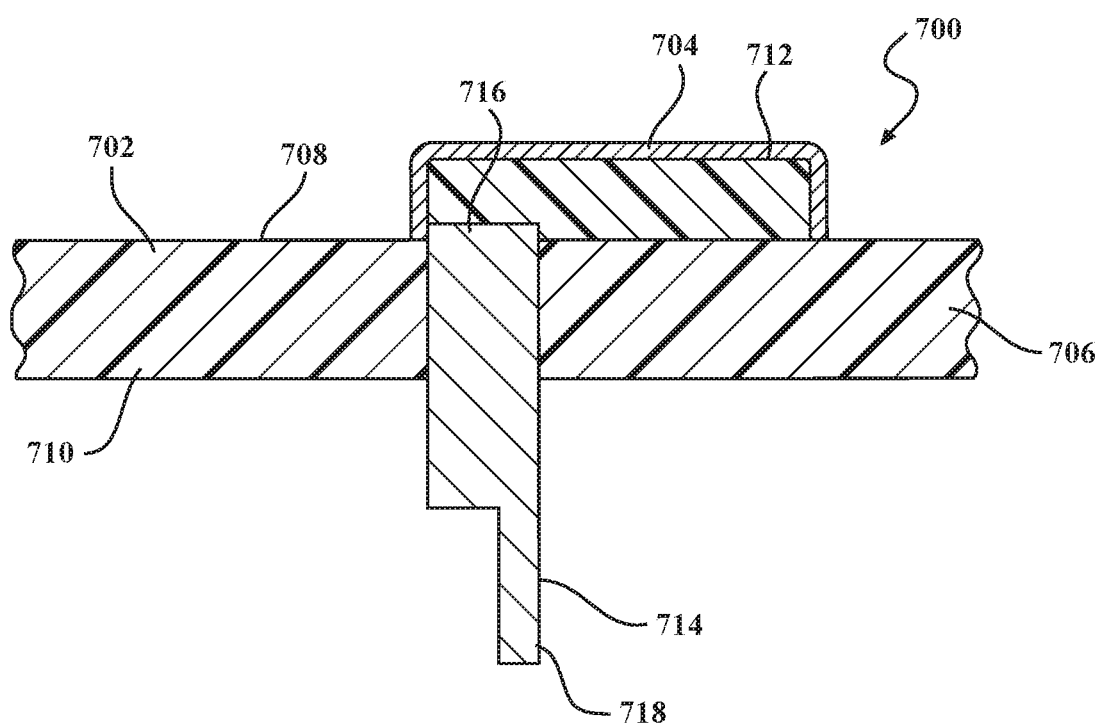
FIG. 18 is a schematic cross-sectional view of a floating metallized element assembly according to a further aspect of the present disclosure.

Referring now to FIG. 18, which illustrates another aspect of a floating element assembly 700 in accordance with the present disclosure. As shown, the floating metallized assembly 700 can include a work piece 702 formed of a plateable resin 704 and a non-plateable resin 706. The work piece 702 includes a front side 708 and a back side 710. As discussed above, the floating element assembly 700 can be formed by a variety of different methods or processes. The floating element assembly can also take on a variety of different configurations for a variety of different applications as will be appreciated by a person of ordinary skill.

The work piece 702 may include at least one plated decorative region 712 of the plateable resin 704 at the front side 708. The work piece 902 may also include a conductive insert 714 that can be placed into the mold such that the non-plateable resin 706 and the plateable resin 704 when injected into the mold are injected around the conductive insert 714 such that it is encapsulated in the work piece 702. The conductive insert 714 may be located in the mold such that its first surface 716 passes through and past the non-conductive resin portion 706 of the work piece 702 and communicates with the plateable resin 704. The conductive insert 714 may also be disposed in the mold such that it has a second surface 718 that is exposed on a back side 710 of the work piece 702. The conductive insert 714 may be configured as a metal pin. However, a variety of other suitable structures may be employed.

According to an aspect, the second surface 718 or other adjacent portion of the conductive insert 714 may be placed in communication with the power source such that current can be passed to the plateable resin 704 by the conductive insert 714. The conductive insert 714 will allow electricity (electrons) to flow through the plastic part via the conductive insert 714 and onto the surface of the plateable resin 704 on the front side 708. This can allow the exposed first surface 716 of the conductive insert 714 to completely plate over without the conductive insert 714 being visible so as to provide a floating metallized element. According to an aspect, the first surface 716 of the conductive insert 714 may be slightly proud of the non-plateable surface 706 such that electricity can flow directly to the plateable surface 704. This aspect can yield another assembly 700 with floating metal plated elements without the separate plateable circuits or network.

According to another aspect, the floating metallized elements, i.e., the metal plated regions may also provide functionality benefits in addition to the aesthetic benefits described herein. For example, the floating metallized elements can serve to respond to touch in order to serve touch applications. According to an aspect, for example, a capacitive touch sensor could be disposed on the backside of the part and in communication with the floating element such that it serves a "button" or a "switch" so that it not only functions as decoration but has a functional aspect as well. According to an aspect, touching or depressing the metalized element, can result in an associated function, such as turning on a light or other function.

Obviously, many modifications and variations of the present disclosure are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps operations, elements, components, and/or groups or combinations thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device or assembly may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of manufacturing a floating metallized element assembly, comprising the steps of:
   initiating a multi-shot injection process to mold a work piece;
   injecting a non-plateable resin into a mold cavity;
   injecting a plateable resin into the mold cavity;
   forming a plurality of plated decorative regions on a front side of the work piece each visibly surrounded by the non-plateable resin;
   forming a plurality of networks of plateable resin on a non-visible back side of the work piece;
   forming a plurality of discrete current paths extending from the plurality of networks to the plurality of plated decorative regions to form circuits;
   connecting a positive terminal of each of a first power source and a second power source that is separate from the first power source to a plurality of anodes and immersing the plurality of anodes in an aqueous solution having a specific chemistry;
   connecting a negative terminal of each of the first power source and the second power source to one of a plurality of points of contact on one of the plurality of networks of the plateable resin of the work piece;
   fully immersing the work piece in the aqueous solution;
   positively charging the plurality of anodes using the positive terminals of the first power source and the second power source and negatively charging the plurality of networks and plated decorative region of the plateable resin through the plurality of points of contact using the negative terminals of the first of power source and the second power source;
   and
   creating a plurality of metal surfaces having different surface finishes having different gloss levels on the plurality of plated decorative regions of the same work piece, wherein the plurality of metal surfaces are disposed over a three-dimensional surface of the work piece, wherein different surface finishes of the plurality of metal surfaces are created via application of separate currents through separate circuits from the separate first and second power sources;
   wherein the first and second power sources provide the separate currents, where the separate currents have different current levels that are increased or decreased relative to each other, wherein the different gloss levels result from the different current levels that are applied in combination with the specific chemistry of the aqueous solution.

2. The method as set forth in claim 1, further including the step of rendering the plateable resin conductive.

3. The method as set forth in in claim 2, wherein the step of rendering the plateable resin conductive includes depositing a catalyst on the plateable resin.

4. The method as set forth in in claim 2, wherein the step of rendering the plateable resin conductive includes etching the plateable resin.

5. The method as set forth in claim 1, further including the step of surrounding the plurality of discrete current paths with the non-plateable resin.

6. The method as set forth in claim 1, further including the step of locating a conductive insert in the mold cavity to be encapsulated by the plateable resin and the non-plateable resin.

7. The method as set forth in claim 6, further including the step of connecting a power source to the conductive insert.

8. The method as set forth in claim 6, further including orienting the conductive insert so that a first surface of the conductive insert passes through and past the plateable resin and a second surface exposed on the back side of the work piece.

9. The method as set forth in claim 1, further including the step of providing an increased electrical current to the at least one of the plurality of metal surfaces as compared to the electrical current provided to the another of the plurality of metal surfaces.

10. The method as set forth in claim 1, wherein at least one of the plurality of metal surfaces being different from another of the plurality of metal surfaces.

11. The method as set forth in claim 1, wherein the plurality of metal surfaces is selected from the group consisting of chromium, copper, nickel, palladium, gold, or cobalt.

12. The method as set forth in claim 6, wherein the conductive insert is a metal pin.

13. The method as set forth in claim 1, wherein the plurality of plated decorative regions have a first molded texture on the front side of the work piece and the non-plateable resin has a second molded texture different than the first molded texture.

14. The method as set forth in claim 1, wherein the different gloss levels are different chrome gloss levels.

15. The method as set forth in claim 14, wherein the different metal surface finishes having different gloss levels includes a bright chrome finish and a satin chrome finish.

16. The method as set forth in claim 14, wherein the different metal surface finishes having different gloss levels includes a dark trivalent chrome finish and a bright trivalent chrome finish being brighter than the dark trivalent chrome finish.

17. The method as set forth in claim 14, the different metal surface finishes having different gloss levels includes a dark hexavalent chrome finish and a bright hexavalent chrome finish being brighter than the dark hexavalent chrome finish.

18. A method of manufacturing a floating metallized element assembly, comprising the steps of:
    initiating a multi-shot injection process to mold a work piece;
    injecting a non-plateable resin into a mold cavity;
    injecting a plateable resin into the mold cavity;
    forming a plurality of plated decorative regions on a front side of the work piece each visibly surrounded by the non-plateable resin;
    forming a plurality of networks of plateable resin on a non-visible back side of the work piece;
    forming a plurality of discrete current paths extending from the plurality of networks to the plurality of plated decorative regions to form circuits;
    creating at least one barrier in electrical conductivity on each of the front side and the back side of the work piece to define the plurality of decorative regions being separately conductive and electrically isolated from one another, the at least one barrier on the front side of the work piece being formed using a method different than that used to form the at least one barrier on the back side of the work piece;
    connecting a positive terminal of each of a first power source and a second power source to a plurality of anodes and immersing the plurality of anodes in an aqueous solution having a specific chemistry;
    connecting a negative terminal of each of the first power source and the second power source to one of a plurality of points of contact on one of the plurality of networks of the plateable resin of the work piece;
    fully immersing the work piece in the aqueous solution;
    positively charging the plurality of anodes using the positive terminals of the first power source and the second power source and negatively charging the plurality of networks and plated decorative region of the plateable resin through the plurality of points of contact using the negative terminals of the first of power source and the second power source; and
    creating a plurality of metal surfaces on the plurality of plated decorative regions, including a first surface finish and a second surface finish, wherein the plurality of metal surfaces are disposed over a three-dimensional surface of the work piece, wherein the first and second surface finishes are different having different gloss levels via application of separate currents through the separately conductive decorative regions;
    wherein the first and second power sources provide the separate currents, where the separate currents have different current levels that are increased or decreased relative to each other, wherein the different gloss levels result from the different current levels that are applied in combination with the specific chemistry of the aqueous solution.

19. The method as set forth in claim 18, wherein the at least one barrier on the front side of the work piece is offset from the at least one barrier on the back side of the work piece.

20. The method as set forth in claim 18, wherein the work piece includes a transparent or translucent material at the at least one barrier to allow light therethrough.

21. The method as set forth in claim 18, wherein the method used to form the at least one barrier on one of the front side and the back side includes injection molding using a material resistant to plating and the method used to form the at least one barrier on another of the front side and the back side includes applying a plating resistant coating to the work piece.

22. The method as set forth in claim 18, wherein the different gloss levels are different chrome gloss levels.

* * * * *